United States Patent
Guo

(10) Patent No.: US 11,206,176 B2
(45) Date of Patent: Dec. 21, 2021

(54) PREVENTING FAILURE PROCESSING DELAY

(71) Applicant: NEW H3C TECHNOLOGIES CO., LTD., Hangzhou (CN)

(72) Inventor: Daorong Guo, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 24 days.

(21) Appl. No.: 16/334,318

(22) PCT Filed: Sep. 19, 2017

(86) PCT No.: PCT/CN2017/102222
§ 371 (c)(1),
(2) Date: Mar. 18, 2019

(87) PCT Pub. No.: WO2018/050122
PCT Pub. Date: Mar. 22, 2018

(65) Prior Publication Data
US 2019/0207808 A1    Jul. 4, 2019

(30) Foreign Application Priority Data
Sep. 19, 2016 (CN) .................. 201610830946.X

(51) Int. Cl.
*H04L 12/24* (2006.01)
*H04L 12/703* (2013.01)
(Continued)

(52) U.S. Cl.
CPC ........ *H04L 41/0686* (2013.01); *H04L 41/064* (2013.01); *H04L 41/0681* (2013.01);
(Continued)

(58) Field of Classification Search
CPC ............... H04L 41/0686; H04L 41/064; H04L 41/0681; H04L 43/0811; H04L 43/0817
See application file for complete search history.

(56) References Cited

U.S. PATENT DOCUMENTS 6,373,846 B1 * 4/2002 Daniel ............... H04Q 11/0478
370/395.65
6,535,512 B1 * 3/2003 Daniel ................ H04L 12/5601
370/395.1
(Continued)

FOREIGN PATENT DOCUMENTS

CA     101132320 A    2/2008
CN     101247270 A    8/2008
(Continued)

OTHER PUBLICATIONS

Katz, D. et al., "Bidirectional Forwarding Detection (BFD)," ISSN 2070-1721, Internet Engineering Task Force (IETF) Website, Available Online at https://tools.ietf.org/html/rfc5880, Jun. 2010, 49 pages.
(Continued)

*Primary Examiner* — William G Trost, IV
*Assistant Examiner* — Monishwar Mohan
(74) *Attorney, Agent, or Firm* — McCoy Russell LLP

(57) ABSTRACT

A method and device for preventing a failure processing delay are provided in the disclosure. In an example, when the number of queue elements in an equivalence class time-window queue reaches a set threshold (denoted as N) in a set time-window, it means that there are N Bidirectional Forwarding Detection (BFD) sessions in the same equivalence class set, that detect Down events. It thus can be intelligently inferred that a public network path carrying the N BFD sessions breaks down. For processing a failure in time and reducing data stream loss on an upper layer, the present disclosure may allow reporting a corresponding
(Continued)

Down event for each BFD session in the equivalence class set to which the N BFD sessions belong.

12 Claims, 7 Drawing Sheets

(51) Int. Cl.
   *H04L 12/26* (2006.01)
   *H04L 12/875* (2013.01)
   *H04L 12/865* (2013.01)
   *H04L 29/08* (2006.01)
   *H04L 12/835* (2013.01)
   *H04L 12/721* (2013.01)

(52) U.S. Cl.
   CPC ...... *H04L 43/0811* (2013.01); *H04L 43/0817* (2013.01); *H04L 45/28* (2013.01); *H04L 47/56* (2013.01); *H04L 47/6275* (2013.01); *H04L 67/146* (2013.01); *H04L 45/68* (2013.01); *H04L 47/30* (2013.01)

(56) References Cited

U.S. PATENT DOCUMENTS

| | | | |
|---|---|---|---|
| 7,961,601 B2 * | 6/2011 | Lu | H04L 45/028 370/225 |
| 8,953,460 B1 * | 2/2015 | Addepalli | H04L 43/0811 370/241 |
| 9,674,071 B2 * | 6/2017 | Anand | H04L 47/22 |
| 9,680,694 B1 * | 6/2017 | Kotrabasappa | H04L 12/4641 |
| 9,774,524 B2 * | 9/2017 | D'Souza | H04L 45/22 |
| 9,985,875 B1 * | 5/2018 | Srinath | H04L 45/22 |
| 9,985,883 B2 * | 5/2018 | MeLampy | H04L 45/566 |
| 2009/0010171 A1 | 1/2009 | Gupta et al. | |
| 2009/0046579 A1 * | 2/2009 | Lu | H04L 45/02 370/225 |
| 2010/0049868 A1 * | 2/2010 | Ginsberg | H04L 45/00 709/242 |
| 2010/0246577 A1 * | 9/2010 | Wu | H04L 45/28 370/389 |
| 2011/0286324 A1 * | 11/2011 | Bellagamba | H04L 45/50 370/219 |
| 2013/0061027 A1 * | 3/2013 | Chen | G06F 9/3851 712/234 |
| 2013/0212222 A1 * | 8/2013 | Outlaw | H04L 65/4092 709/219 |
| 2015/0195178 A1 * | 7/2015 | Bhattacharya | H04L 45/745 718/1 |
| 2016/0014002 A1 * | 1/2016 | Bellis | H04L 69/167 709/224 |
| 2016/0036695 A1 * | 2/2016 | Mirsky | H04L 43/0811 370/243 |
| 2017/0302547 A1 * | 10/2017 | Wang | H04L 43/0823 |
| 2017/0346707 A1 * | 11/2017 | Menon | H04L 61/256 |
| 2017/0346709 A1 * | 11/2017 | Menon | H04L 43/0829 |
| 2018/0077051 A1 * | 3/2018 | Nainar | H04L 45/745 |

FOREIGN PATENT DOCUMENTS

| | | | |
|---|---|---|---|
| CN | 101848223 A | | 9/2010 |
| CN | 102347855 A | * | 2/2012 |
| CN | 102347855 A | * | 2/2012 |
| CN | 102347855 A | | 2/2012 |
| CN | 102571601 A | | 7/2012 |
| CN | 102801614 A | | 11/2012 |
| CN | 104506546 A | | 4/2015 |
| CN | 104821957 A | | 8/2015 |
| CN | 105490867 A | | 4/2016 |
| CN | 107846356 A | | 3/2018 |
| JP | 2002033767 A | | 1/2002 |
| JP | 2002354038 A | | 12/2002 |
| JP | 2014522170 A | | 8/2014 |
| JP | 2016048850 A | | 4/2016 |
| WO | 9013197 A1 | | 11/1990 |
| WO | 2010069175 A1 | | 6/2010 |
| WO | 2015172745 A1 | | 11/2015 |

OTHER PUBLICATIONS

ISA State Intellectual Property Office of the People's Republic of China, International Search Report Issued in Application No. PCT/CN2017/102222, dated Dec. 25, 2017, WIPO, 4 pages.
ISA State Intellectual Property Office of the People's Republic of China, Written Opinion of the International Searching Authority Issued in Application No. PCT/CN2017/102222, dataed Dec. 25, 2017, WIPO, 3 pages.
European Patent Office, Extended European Search Report Issued in Application No. 17850323.1, dated May 20, 2019, Germany, 7 pages.
State Intellectual Property Office of the People's Republic of China, Office Action and Search Report Issued in Application No. 201610830946.X, dated Aug. 5, 2019, 8 pages. (Submitted with Partial Translation).
Japanese Patent Office, Office Action Issued in Application No. 2019-515274, dated Jan. 14, 2020, 5 pages. (Submitted with Partial Translation).
State Intellectual Property Office of the People's Republic of China, Office Action and Search Report Issued in Application No. 201610830946.X, dated Feb. 6, 2020, 12 pages. (Submitted with Machine Translation).
State Intellectual Property Office of the People's Republic of China, Office Action and Search Report Issued in Application No. 201610830946.X, dated Jun. 2, 2020, 13 pages. (Submitted with Machine Translation).

* cited by examiner

PREVENTING FAILURE PROCESSING DELAY

CROSS REFERENCE TO RELATED APPLICATION

This present application is a U.S. National Phase of International Patent Application Serial No. PCT/CN2017/102222 entitled "PREVENTION OF FAULT PROCESSING DELAY," filed on Sep. 19, 2017. International Patent Application Serial No. PCT/CN2017/102222 claims priority to Chinese Patent Application No. 201610830946.x filed on Sep. 19, 2016. The entire contents of each of the above-cited applications are hereby incorporated by reference in their entirety for all purposes.

BACKGROUND

Bidirectional Forwarding Detection (BFD) is a general and standardized fast failure detection mechanism, which is irrelevant to any medium or protocol, used for detecting connection conditions of links in an Internet Protocol (IP) network and guaranteeing fast detection of communication failures between devices so as to deal with the failures timely and ensure continuous service operation. For different upper-layer protocols such as a routing protocol and Multiple protocol Label Switching (MPLS), the BFD may allow quick detection of a failure of a bidirectional forwarding link between two devices. Moreover, the BFD can detect a failure within a few milliseconds.

DETAILED DESCRIPTION OF THE EMBODIMENTS

The technical solutions of examples of the present disclosure will be described clearly and fully below in combination with drawings in the examples of the present disclosure. It is apparent that the described examples are merely part of examples of the present disclosure rather than all examples. Other examples achieved by those of ordinary skill in the art based on the examples in the present disclosure without paying creative work shall all fall into the scope of protection of the present disclosure.

In application, a public network path such as a public network tunnel may be virtualized to comprise different paths. Taking Pseudo-Wire (PW) for example, different PWs are associated with different BFD sessions, respectively. It may be detected by the BFD sessions whether the PWs associated with the BFD sessions break down. A common detection manner is as follows: BFD control packets may be periodically transmitted from a device to a peer device; if N BFD control packets are successively transmitted and none response is received from the peer device, the PW associated with the BFD session is considered to be down. Then, a Down event is reported to a BFD drive, and the BFD drive performs a process based on the received Down event.

However, in a scenario where a public network path suffers from network signal attenuation until the session is broke down (hereinafter referred to as a public network path gradually going-down scenario), the states of different BFD sessions carried in the public network path are different. Some BFD sessions may detect that the PWs associated with them are normal, while the states of other BFD sessions are Down. Such an inconsistency may result in a misjudgment for a BFD session, causing a Down event reporting delay and leading to a failure processing delay, eventually.

A method based on an example of the present disclosure, may avoid a Down event reporting delay in a public network path gradually going-down scenario, thereby preventing a failure processing delay caused by the delayed Down event reporting and enhancing the performance of the BFD detection mechanism for the network path gradually going-down scenario.

The method based on an example of the present disclosure will be described below.

Figure 1:
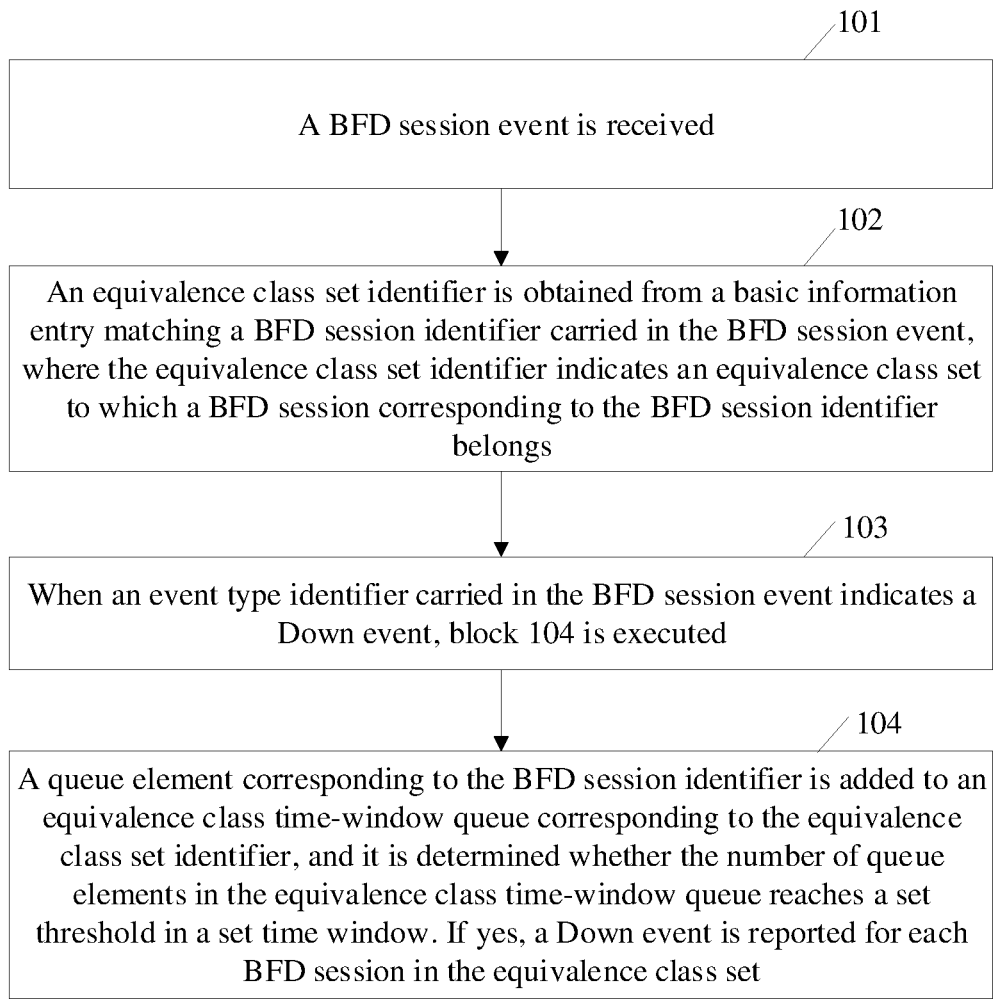
FIG. 1 illustrates a flow chart of a method based on an example of the present disclosure.

FIG. 1 illustrates a flow chart of a method based on an example of the present disclosure. As shown in FIG. 1, the flow may include the following blocks.

At block 101, a BFD session event is received.

As an example, the BFD session event herein is, for example, an event detected by a BFD session for a path (e.g., a PW) associated with the BFD session, and carries at least a BFD session identifier and an event type identifier. The event type identifier will be described below in detail, which will not be redundantly described herein.

At block 102, an equivalence class set identifier is obtained from a basic information entry matching the BFD session identifier carried in the BFD session event, where the equivalence class set identifier indicates an equivalence class set to which a BFD session corresponding to the BFD session identifier belongs.

In the present disclosure, each BFD session has a matching basic information entry, where the matching basic information entry is created at an initial stage of establishing the BFD session. Hereinafter, the basic information entry will be described specially, and not be redundantly described herein.

In the present disclosure, an equivalence class set to which a BFD session belongs may be determined based on a public network path carrying the BFD session. For example, different BFD sessions carried by the same public network path all belong to the same equivalence class set. The structure of the equivalence class set will be described below, which will not be redundantly described herein.

At block 103, when an event type identifier carried in the BFD session event indicates a Down event, block 104 is executed.

At block 104, a queue element corresponding to the BFD session identifier is added to an equivalence class time-window queue corresponding to the equivalence class set identifier, and it is determined whether the number of queue elements in the equivalence class time-window queue reaches a set threshold in a set time-window. If yes, a Down event is reported for each BFD session in the equivalence class set.

In the present disclosure, one equivalence class set corresponds to an equivalence class time-window queue. The equivalence class time-window queue is used to record a BFD session for which a Down event is reported. In other words, the equivalence class time-window queue records BFD sessions for each of which the Down event has been reported. The structure of the equivalence class time-window queue will be described detailed below, which will not be redundantly described herein.

As an example, in block 104, adding the queue element corresponding to the BFD session identifier to the time-window queue corresponding to the equivalence class set identifier includes:
determining whether the equivalence class time-window queue is empty;
if yes, adding the queue element corresponding to the BFD session identifier to the equivalence class time-window queue as a first queue element of the equivalence class time-window queue,
where a timestamp of the added queue element is current system time; and
if no, adding the queue element corresponding to the BFD session identifier behind the last queue element in the equivalence class time-window queue, where a timestamp of the added queue element is current system time.

In the present disclosure, the first queue element of the equivalence class time-window queue dynamically changes, and the dynamical change is specifically as follows:
calculating a difference between the current system time and the timestamp of the first queue element in the equivalence class time-window queue before a BFD session identifier is added behind the last queue element in the equivalence class time-window queue as a queue element, and
deleting the first queue element in the equivalence class time-window queue when a calculation result is greater than a set size for a time-window.

Since the BFD sessions are logically independent of each other, the public network path may be extremely likely to break down when a plurality of BFD sessions in the same equivalence class time-window queue are down in a sufficiently small period of time. In this case, in the present disclosure, by reporting a Down event for a BFD session changing into a Down status in a set time-window, the Down event in the public network can be reported as early as possible.

With a long time interval between the first queue element and the queue element currently being reported a Down event (i.e., they are not in the same time-window), the first queue element may not serve as a basis for accurately determining the anomaly of the public network path even though retained in the equivalence class time-window queue. Therefore, the first queue element in the equivalence class time-window queue may be deleted when the calculation result is greater than the set size for a time-window. That is, the deleted queue element and other queue elements in the equivalence class time-window queue are not in the same time-window, and therefore, the objective of reporting a Down event for a BFD session that is down in a set time-window may not be achieved. It thus can be seen that the first queue element in the equivalence class time-window queue will be deleted over a time period. When the first queue element in the equivalence class time-window queue is deleted, the second queue element that is previously located behind the deleted first queue element will naturally become the first queue element.

While the number of the queue elements in the equivalence class time-window queue is obtained, a corresponding counter may be set up for the equivalence class time-window queue. The counter is used to count the number of the queue elements in the equivalence class time-window queue. When a Down event of a BFD session is received and a BFD session identifier is added to the equivalence class time-window queue, the counter corresponding to the equivalence class time-window queue may be accordingly updated. For example, the counter increases by 1 every time when a queue element is added to the equivalence class time-window queue.

Thus, the flow shown in FIG. 1 is completed. It can be seen from the flow shown in FIG. 1 that when the number of the queue elements in the equivalence class time-window queue reaches a set threshold (denoted as N) in a set time-window, it means that each of N BFD sessions detects a Down event in a preset time in the same equivalence class set. Based on this, it may be inferred that the public network path (which is substantially the same public network path carrying different BFD sessions in the equivalence class set) corresponding to the equivalence class set breaks down. In order to facilitate processing a failure in time and reducing data stream loss of an upper layer, as described in block 104, each BFD session in the equivalence class set may be reported the corresponding Down event in the present disclosure. This may avoid a delay for reporting a Down event in the public network path gradually going-down scenario, thereby preventing a failure processing delay caused by the delayed Down event reporting, enhancing the adaptability of the BFD detection mechanism to the public network path gradually going-down scenario and effectively solving the defects of the BFD detection mechanism under the condition of signal degradation.

Some entries involved in the present disclosure will be described below.

A basic information table consists of basic information entries. The basic information entry matches the BFD session.

The basic information entry matching the BFD session mainly includes:
1) Sid: a BFD session identifier, wherein each BFD session has a unique BFD session identifier;
2) Valid: an entry validity identifier, for example, when Valid is 1, it represents that the basic information entry is valid; on the contrary, when Valid is 0, it represents that the basic information entry is invalid;
3) Status: a status of a BFD session, which may include UP, Down, Init, etc.; and
4) Class ID: an identifier of an equivalence class set to which a BFD session belongs. The equivalence class set is defined based on the public network path, and all BFD sessions carried by the same public network path may be classified into the same equivalence class set.

Table 1 illustrates a basic information table.

TABLE 1

| Sid | Valid | Status | ClassID |
|-----|-------|--------|---------|
| 0   | 1     | Up     | 1       |
| 1   | 1     | NotUp  | N       |
| 2   | 1     | NotUp  | 1       |
| ... | ...   | ...    | ...     |

TABLE 1-continued

| Sid | Valid | Status | ClassID |
|-----|-------|--------|---------|
| 509 | 1 | Up | N |
| 510 | 1 | Up | 1 |
| 511 | 0 | Up | — |

Based on the structure of the basic information entry described herein, obtaining the basic information entry matching the BFD session identifier carried in the BFD session event from a basic information table in the above block 102 is specifically as follows:
searching the basic information table for a basic information entry with the Sid being the BFD session identifier carried in the BFD session event, and
taking the found basic information entry as the basic information entry matching the BFD session identifier carried in the BFD session event.

An equivalence class set table is composed of equivalence class sets. Initially, each equivalence class set in the equivalence class set table has none equivalence class set element.

When a BFD session changes into the UP status, the identifier of the BFD session in the UP status is constituted as a corresponding equivalence class set element and then added to the equivalence class set to which the BFD session belongs.

When a BFD session changes into the Down status, an equivalence class set element corresponding to the identifier of the BFD session is deleted from the equivalence class set to which the BFD session belongs.

When a BFD session is deleted, an equivalence class set element corresponding to the identifier of the BFD session is deleted from the equivalence class set to which the BFD session belongs.

When a PW associated with a BFD session is deleted, an equivalence class set element corresponding to the identifier of the BFD session is deleted from the equivalence class set to which the BFD session belongs.

As an example, the equivalence class set table may be a two-dimensional chain table. In the two-dimensional chain table, each two-dimensional chain entry represents an equivalence class set, and is mainly composed of a header and a corresponding equivalence class set element.

The header is composed of the following three parts:
NextClass: pointing to next equivalence class set;
ClassID: an equivalence class set identifier; and
HeadPtr: pointing to a first equivalence class set element in the two-dimensional chain entry.

The equivalence class set element is composed of the following three parts:
Sid: a BFD session identifier, where each BFD session has an identifier and corresponding data information may be obtained by using the identifier;
Prev: pointing to a previous equivalence class set element, where Prev in the first equivalence class set element points to the header; and
Next: pointing to a next equivalence class set element, where Next in the last equivalence class set element is empty.

Figure 2:
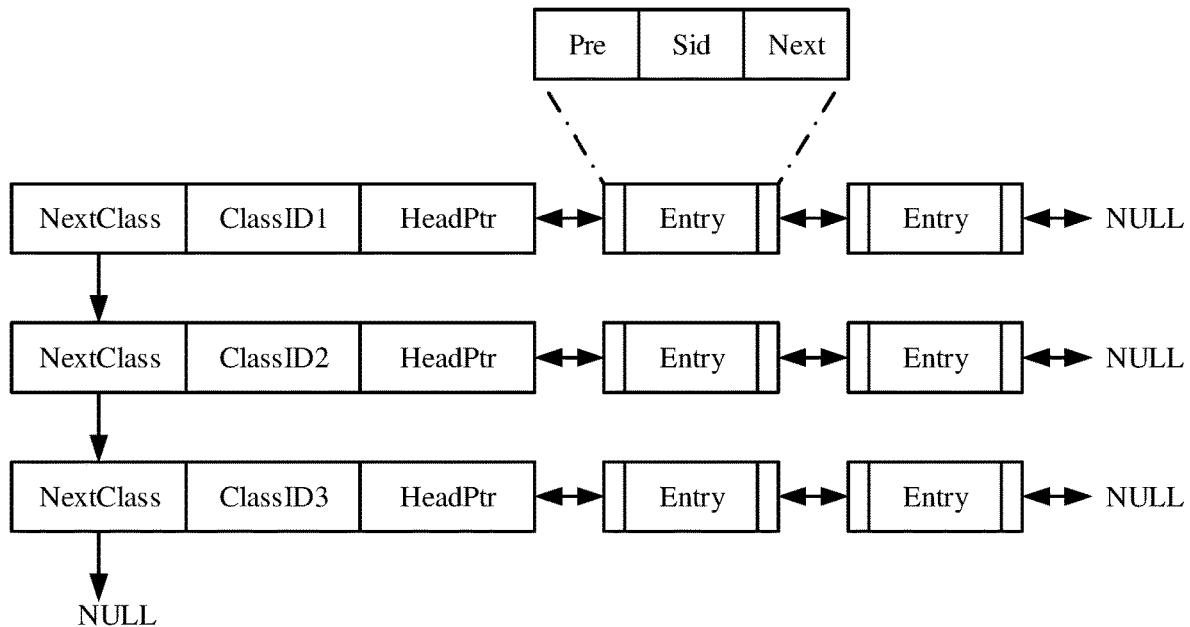
FIG. 2 illustrates a structure diagram of an equivalence class set table based on an example of the present disclosure.

FIG. 2 illustrates a structure of an equivalence class set table. From the equivalence class set table described above, it can be seen that the equivalence class set table stores an identifier of a BFD session in the UP status. When the number of the queue elements in the equivalence class time-window queue reaches a set threshold in a set time-window, a Down event will be reported for each BFD session in the equivalence class set. As described above, the equivalence class time-window queue is used to record a BFD session for which a Down event is reported. Based on this, when a BFD session for which a Down event is reported is newly added to the equivalence class time-window queue, if the added BFD session is still recorded in the equivalence class set table at this time, it is needed to delete the BFD session from the equivalence class set so as to avoid repeatedly reporting a Down event for the same BFD session. Based on this, the equivalence class set element corresponding to the identifier of the newly added BFD session may be further deleted from the corresponding equivalence class set when the number of the queue elements in the equivalence class time-window queue reaches the set threshold in the set time-window in the above block 104. Accordingly, a corresponding counter may be set up for the equivalence class set. The counter is used to count the number of the BFD session identifiers in the equivalence class set.

An equivalence class time-window queue table is composed of an equivalence class time-window queue. The structure of the equivalence class time-window queue table is similar to that of the equivalence class set.

In the present disclosure, the equivalence class time-window queue table may be a two-dimensional chain table. In the two-dimensional chain table, each two-dimensional chain entry represents an equivalence class time-window queue, and is mainly composed of a header and a queue element.

The header is composed of the following three parts:
NextClass: pointing to a next equivalence class time-window queue;
ClassID: an equivalence class set identifier; and
HeadPtr: pointing to a first queue element in the two-dimensional chain entry.

The queue element is composed of the following three parts:
Sid: a BFD session identifier;
Prev: pointing to a previous queue element, where Prev in the first queue element points to the header; and
Next: pointing to a next queue element, where Next in the last queue element is empty.

Figure 3:
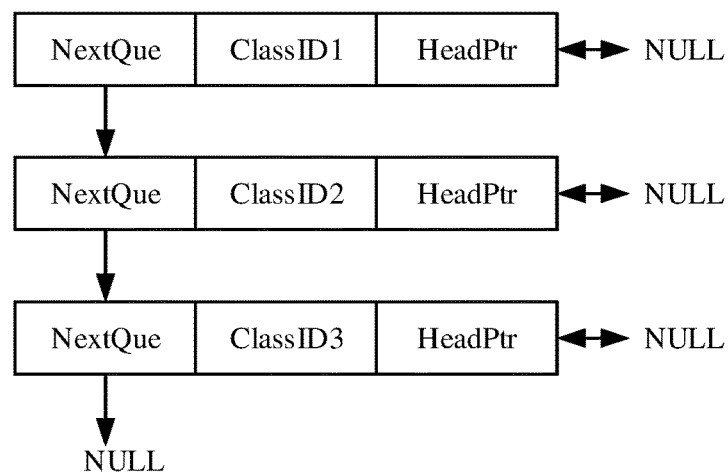
FIG. 3 illustrates a structure diagram of an equivalence class time-window queue based on an example of the present disclosure.

Initially, each equivalence class time-window queue in the equivalence class time-window queue table has none queue element, as shown in FIG. 3.

Figure 4:
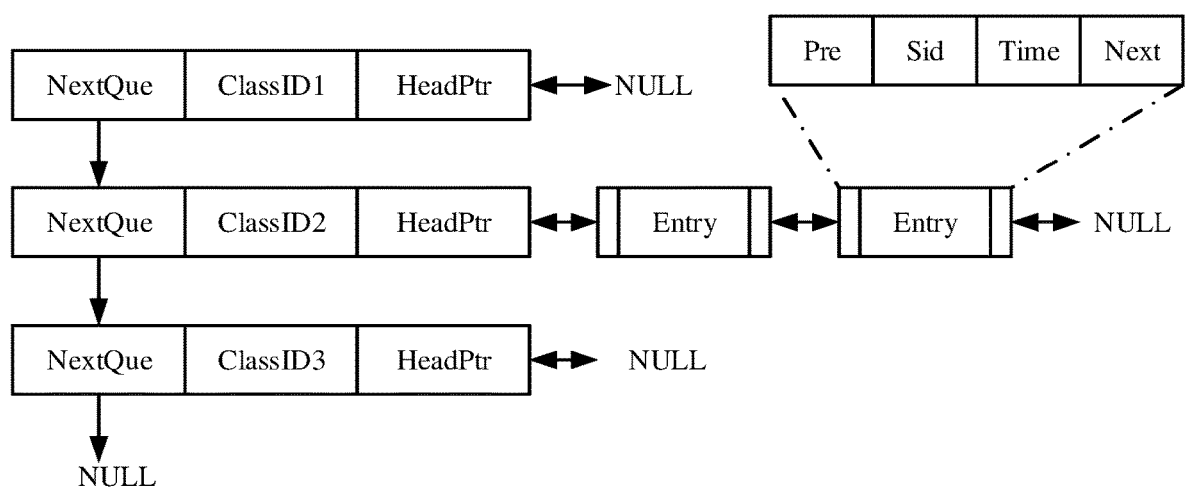
FIG. 4 illustrates a structure diagram of another equivalence class time-window queue based on an example of the present disclosure.

Additionally, when a BFD session changes into the Down status, the identifier of the BFD session in the Down status may be constituted as a corresponding queue element and then added to the corresponding equivalence class time-window queue. FIG. 4 illustrates the status of the equivalence class time-window queue at a certain time when a BFD session changes into a Down status.

Based on the different entries described above, the flow shown in FIG. 1 will be described below with an example.

Figure 5:
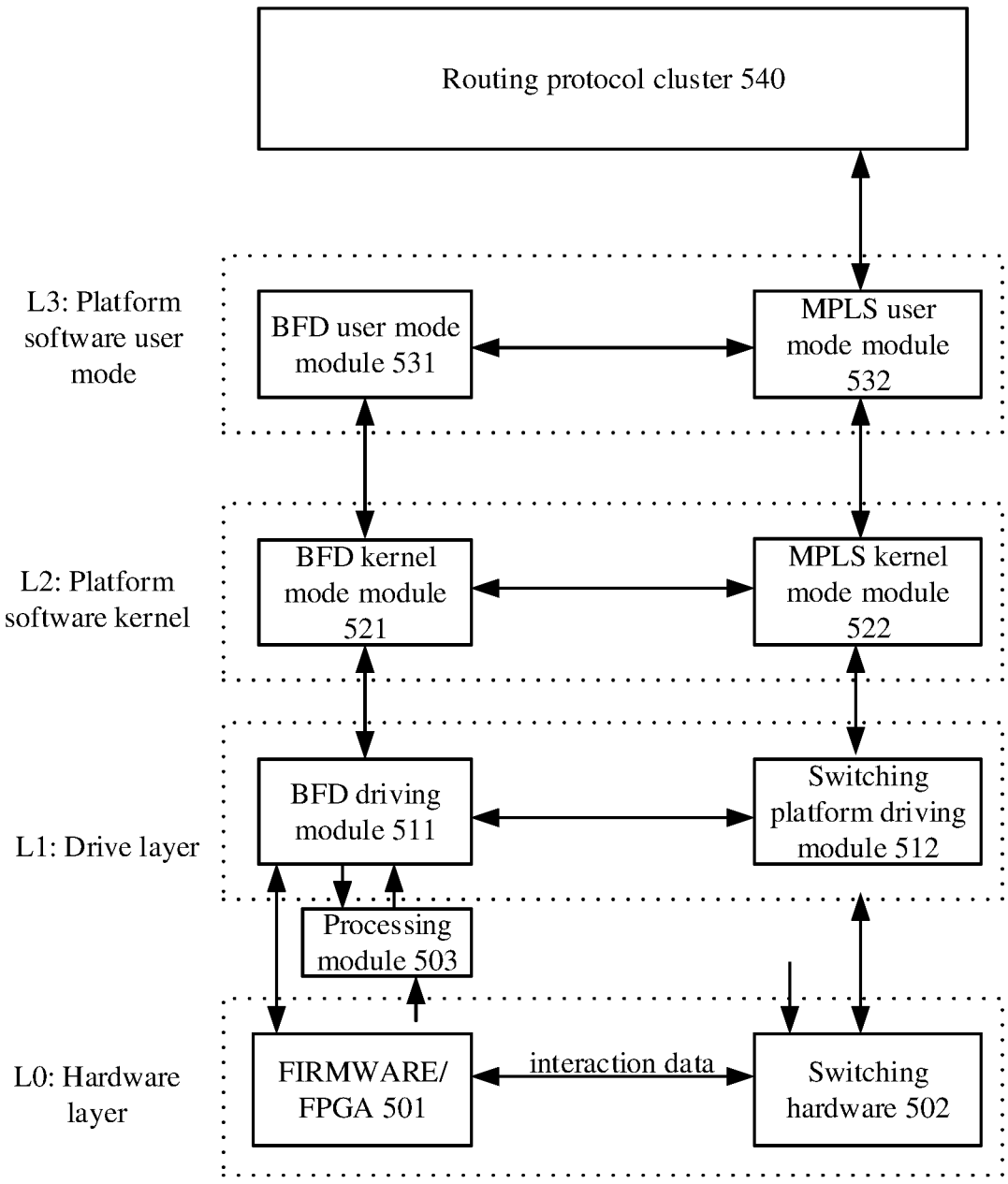
FIG. 5 illustrates a block diagram of a BFD internal system based on an example of the present disclosure.

In an example of the present disclosure, to prevent a failure processing delay caused by delayed Down event reporting, the present disclosure provides a BFD detection structure. As shown in FIG. 5, a general BFD detection structure may include a switching chip (taking FIRMWARE/FPGA for example in FIG. 5) 501 and a switching hardware 502 located on a hardware layer, a BFD driving module 511 and a switching platform driving module 512 on a drive layer, a BFD kernel mode module 521 and an MPLS kernel mode module 522 in a platform software kernel, a BFD user mode module 531 and an MPLS user mode module 532 in a platform software user mode, and a routing protocol cluster 540. According to the present disclosure, a processing module 503 is newly added between the drive layer and the hardware layer. The newly added processing module 503 is connected between the BFD driving module 511 on the drive layer and a switching chip 501 on the hardware layer, as shown in FIG. 5. It needs to be noted that the processing module 503 in the present disclosure may be in the form of software or hardware. In case of in the form of software, the processing module 503 may be configured on the drive layer, but the configuration does not change the original core flow for processing a BFD session, and guarantees there is no influence on execution of the modules on different layers. In case of in the form of hardware, it may be, for example, integrated in a Field Programmable Gate Array (FPGA) or in one core of a multi-core Central Processing Unit (CPU).

Figure 6:
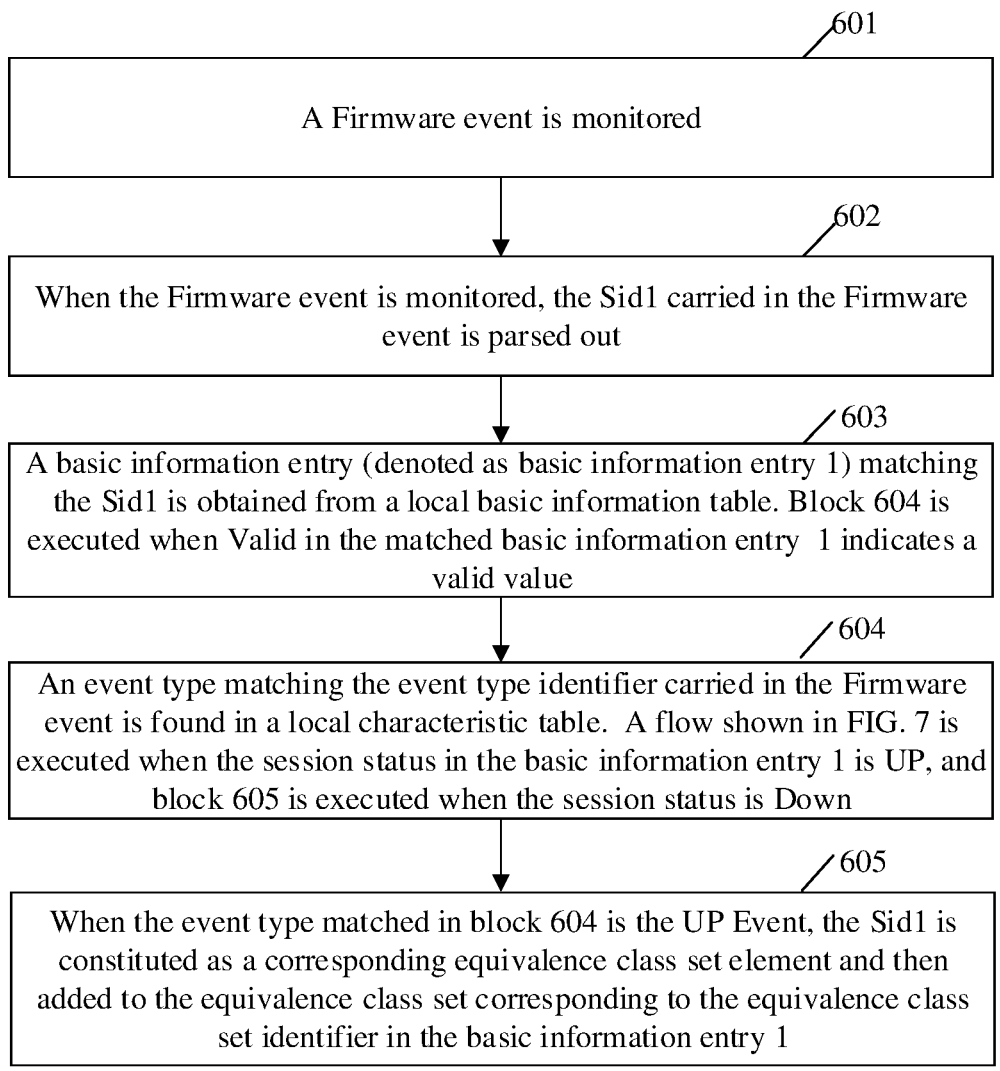
FIG. 6 illustrates a flow chart of an example based on the present disclosure.

FIG. 6 illustrates a flow chart of an example based on the present disclosure. The example flow is executed by the processing module shown in FIG. 5. As shown in FIG. 6, the flow may include the following blocks.

At block 601, a Firmware event is monitored.

FIG. 5 illustrates an example where a switching chip of FIRMWARE/FPGA is implemented as a BFD hardware layer. A BFD session event is taken as an example of a Firmware event.

In this example, the Firmware event may be triggered by a BFD session changing into the UP status, and may also be triggered by a BFD session changing into the Down status, etc., which will be described in details below. In the present disclosure, the Firmware event carries at least a BFD session identifier and an event type identifier. For example, if the Firmware event is triggered by a BFD session changing into the UP status, the BFD session identifier carried in the Firmware event is the identifier of the BFD session in the UP status, and the event type identifier is the identifier of an UP Event.

For convenience of description, the BFD session identifier carried in the Firmware event is denoted as Sid1 in this example.

At block 602, when the Firmware event is monitored, the Sid1 carried in the Firmware event is parsed out.

At block 603, a basic information entry (denoted as basic information entry 1) matching the Sid1 is obtained from a basic information table. Block 604 is executed when Valid in the matched basic information entry 1 indicates a valid value.

Based on the structure of the basic information entry described above, in this block 603, obtaining the basic information entry matching the Sid1 from the basic information table is specifically as follows: searching the basic information table for a basic information entry with the Sid1, where the searched basic information entry is the basic information entry matching the Sid1.

As an example, when Valid in the matched basic information entry 1 indicates an invalid value, the Firmware event may be reported to the BFD driving module, and the BFD driving module may then perform a corresponding processing based on the event type identifier carried in the Firmware event, which will not be redundantly described herein.

Figure 7:
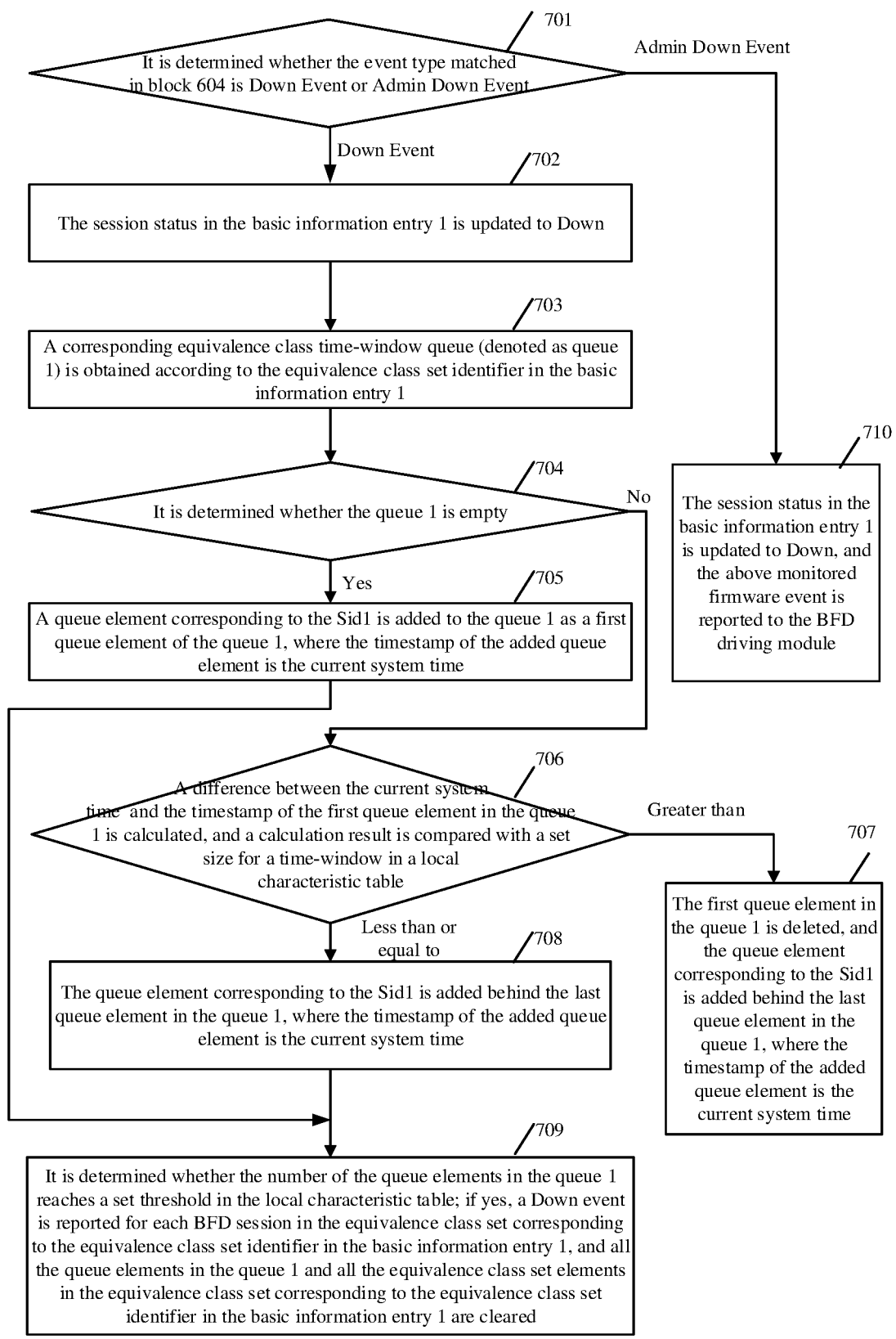
FIG. 7 illustrates a flow chart of another example based on the present disclosure.

At block 604, an event type matching the event type identifier carried in the Firmware event is found in a characteristic table. A flow shown in FIG. 7 is executed when the session status in the basic information entry 1 is UP, and block 605 is executed when the session status is Down.

Although the session statuses of the basic information entry as described above also include Init, etc., detailed descriptions are made on the session status UP and status Down rather than other cases in the present disclosure.

In the present disclosure, the characteristic table is used to store user's customized information which includes the following several characteristic entries:

MaxSessions: the maximum number of sessions supported by a Provider Edge (PE), for example, 512 BFD sessions supported;

Admin Down Event: an administration (Admin) Down event with a corresponding event type identifier (denoted as a first identifier); when a user initiatively deletes a BFD session, it means an Admin Down Event;

Down Event: a BFD Down event with a corresponding event type identifier (denoted as a second identifier);

UP Event: a BFD session UP event with a corresponding event type identifier (denoted as a third identifier);

Set size for a time-window: BFD sessions for which a Down event is reported in the time-window are considered as having reported the Down event simultaneously, which will be described below and not redundantly described herein; and Set threshold: the set threshold in the above block 104. Table 2 illustrates the characteristic table.

TABLE 2

| Name | Value | Notes |
| --- | --- | --- |
| MaxSessions | 512 | |
| Admin Down Event | 0 | First identifier |
| Down Event | 2 | Second identifier |
| UP Event | 3 | Third identifier |
| Set size for a time window | | |
| Set threshold | | |

Based on the characteristic table described above, the block 604 is specifically as follows: determining the event type of the Firmware event as Admin Down Event if the event type identifier carried in the Firmware event is the first identifier, for example, 0; determining an event type matching the event type identifier carried in the Firmware event as Down Event if the event type identifier carried in the Firmware event is the second identifier, for example, 2; and determining an event type matching the event type identifier carried in the Firmware event as an UP Event if the event type identifier carried in the Firmware event is the third identifier, for example, 3. In Table 2, "set size for a time-window" and "set threshold" may be configured by a user based on actual situations. For example, under the circumstances of a packet transmitting interval of a BFD session being 10 ms and continuous monitoring times being 3, the set size for a time-window may be 2 ms, and the set threshold may be 3.

At block 605, when the event type matched in block 604 is the UP Event, the Sid1 is constituted as a corresponding equivalence class set element and then added to the equivalence class set corresponding to the equivalence class set identifier in the basic information entry 1.

Based on the structure of the equivalence class set described above, constituting the Sid1 as the corresponding equivalence class set element and adding it to the equivalence class set corresponding to the equivalence class set identifier in the basic information entry 1 in block 605 are specifically as follows: search a two-dimensional chain table (a two-dimensional chain table corresponding to the equivalence class set) for a two-dimensional chain entry with header containing the equivalence class set identifier, and adding an equivalence class set element corresponding to the Sid1 to the equivalence class set corresponding to the searched two-dimensional chain entry. The equivalence class set element corresponding to the Sid1 is specifically constituted based on the structure of the equivalence class set element as described above.

As described above, the event type matched in block 604 may also be Down Event or Admin Down Event. In the block 605, when it is found that the event type matched in block 604 is the Down Event or the Admin Down Event, the above Firmware event is directly reported to the BFD driving module in an existing manner, and corresponding processing is then performed by the BFD driving module based on the event type identifier carried in the Firmware event, which will not be redundantly described herein.

Thus, the flow shown in FIG. 6 is completed.

FIG. 7 illustrates a flow chart of another example based on the present disclosure. As described above, the flow is executed when the session status in the basic information entry 1 is determined as UP in the above block 604.

As shown in FIG. 7, the flow may include the following blocks.

At block 701, it is determined whether the event type matched in block 604 is Down Event or Admin Down Event, and block 702 is executed when it is the Down Event; and block 710 is executed when it is the Admin Down Event.

The block 701 is executed when the session status in the basic information entry 1 is UP.

In the example, if the event type matched in the above block 704 is the event type such as UP Event other than the Down Event and the Admin Down Event, the above Firmware event may be reported to the BFD driving module, and the BFD driving module may then perform a corresponding processing based on the event type identifier carried in the Firmware event, which will not be redundantly described herein.

At block 702, the session status in the basic information entry 1 is updated to Down. Then, block 703 is executed.

At block 703, a corresponding equivalence class time-window queue (denoted as queue 1) is found based on the equivalence class set identifier in the basic information entry 1.

Based on the structure of the equivalence class time-window queue described above, the block 703 is specifically as follows: search a two-dimensional chain table (a two-dimensional chain table corresponding to the equivalence class time-window queue) for a two-dimensional chain entry of which header contains the equivalence class set identifier in the basic entry 1, where the searched two-dimensional chain entry is denoted as the above queue 1.

At block 704, it is determined whether the queue 1 is empty. If yes, block 705 is executed; and if no, block 706 is executed.

Determining whether the queue 1 is empty herein is substantially as follows: determining whether a queue element exists in the queue 1, and determining that the queue 1 is empty if no queue element exists in the queue 1; otherwise, determining that the queue 1 is not empty.

At block 705, a queue element corresponding to the Sid1 is added to the queue 1 as a first queue element of the queue 1, where the timestamp of the added queue element is the current system time. Then, block 709 is executed.

Based on the structure of the equivalence class time-window queue described above, the block 705 is specifically as follows: constituting the Sid1 as a corresponding queue element based on the structure of the queue element in the equivalence class time-window queue and adding the constituted queue element to the queue 1 (i.e., to the two-dimensional chain entry found in the above block 703). In this case, the added queue element is the first queue element in the queue 1.

At block 706, a difference between the current system time and the timestamp of the first queue element in the queue 1 is calculated, and a calculation result is compared with a set size for a time-window in a characteristic table. If the former is greater than the latter, block 707 is executed; and if the former is smaller than or equal to the latter, block 708 is executed.

At block 707, the first queue element in the queue 1 is deleted, and the queue element corresponding to the Sid1 is added behind the last queue element in the queue 1, where the timestamp of the added queue element is the current system time. The current flow is finished.

In this example, after the first queue element in the queue 1 is deleted, other queue elements in the queue 1 are sequentially moved towards the location of the deleted first queue element, and eventually, the original second queue element in the queue 1 becomes into the first queue element, and so on. At block 708, the queue element corresponding to the Sid1 is added behind the last queue element in the queue 1, where the timestamp of the added queue element is the current system time. Then, block 709 is executed.

At block 709, it is determined whether the number of the queue elements in the queue 1 reaches a set threshold in the characteristic table; if yes, a Down event is reported for each BFD session in the equivalence class set corresponding to the equivalence class set identifier in the basic information entry 1, and all the queue elements in the queue 1 and all the equivalence class set elements in the equivalence class set corresponding to the equivalence class set identifier in the basic information entry 1 are cleared.

After the Down event is reported for each BFD session in the equivalence class set corresponding to the equivalence class set identifier in the basic information entry 1, all the queue elements in the queue 1 and all the equivalence class set elements in the equivalence class set corresponding to the equivalence class set identifier in the basic information entry 1 become meaningless. Therefore, to save storage resources, as an example, all the queue elements in the queue 1 and all the equivalence class set elements in the equivalence class set corresponding to the equivalence class set identifier in the basic information entry 1 may be cleared at the block 709.

As an example, when the determination result of the block 709 is not, the above Firmware event may be reported to the BFD driving module, and the BFD driving module may then perform a corresponding processing based on the event type identifier carried in the Firmware event, which will not be redundantly described herein.

When the Down event is reported for each BFD session in the equivalence class set herein, it also means reporting the Down event for each BFD session in the equivalence class set to the BFD driving module, and the BFD driving module may then perform a processing based on the Down event, which will not be redundantly described herein.

At block 710, the session status in the basic information entry 1 is updated to Down, and the above monitored Firmware event may be reported to the BFD driving module. The current flow is finished.

After receiving the Firmware event, the BFD driving module performs processing based on the Firmware event, which will not be redundantly described herein.

Thus, the flow shown in FIG. 7 is completed.

In such a scenario that 64 BFD sessions are carried on the same public network path and a detection period for the BFD session is 10 ms, where a detection packet is to be transmitted 3 times in the detection period, if the existing scheme is adopted, a delay in reporting a Down event exceeds 128 ms, which is far beyond the packet delay of less than 50 ms as required by telecommunications. However, if the method provided in the present disclosure is used, the delay in reporting a Down event is less than 30 ms, thereby greatly shortening the delay in reporting a Down event.

The method provided in the present disclosure is described above.

A device provided in the present disclosure will be described below.

Figure 8:
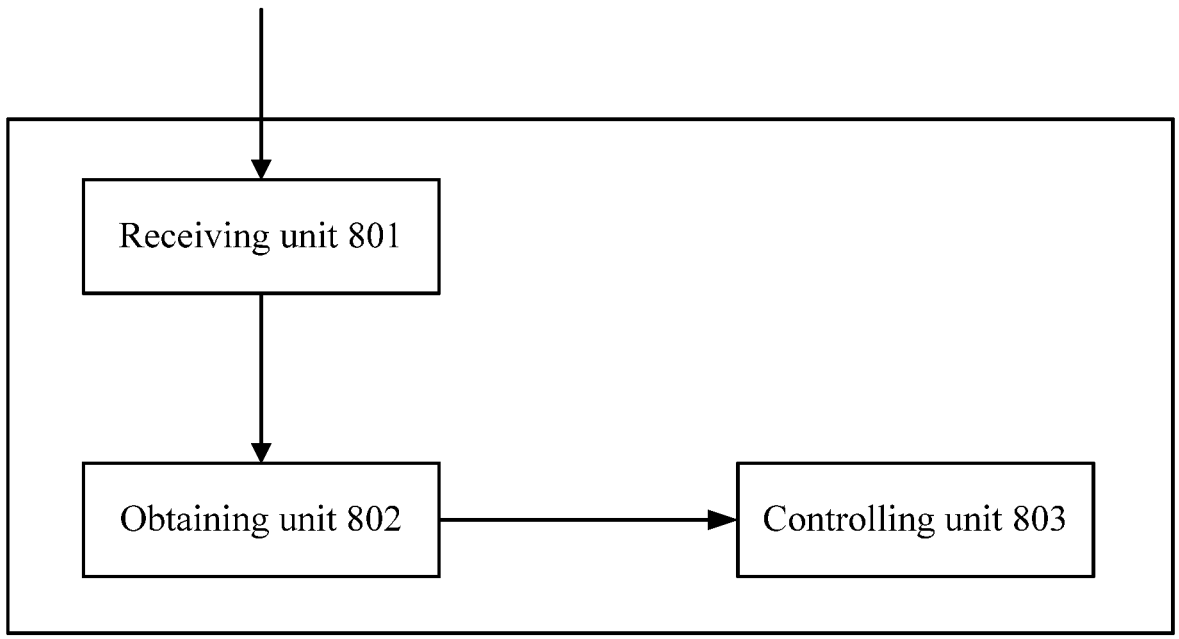
FIG. 8 schematically illustrates a structure diagram of a device based on an example of the present disclosure.

FIG. 8 illustrates a structure diagram of a device based on an example of the present disclosure. As shown in FIG. 8, the device includes:

a receiving unit 801 configured to receive a BFD session event, where the BFD session event carries a BFD session identifier and an event type identifier;

an obtaining unit 802 configured to obtain an equivalence class set identifier from a basic information entry matching the BFD session identifier, where the equivalence class set identifier indicates an equivalence class set to which a BFD session corresponding to the BFD session identifier belongs, and BFD sessions carried by a same public network path belong to a same equivalence class set; and a controlling unit 803 configured to, when the event type identifier indicates a Down event, add a queue element corresponding to the BFD session identifier to an equivalence class time-window queue corresponding to the equivalence class set identifier, determine whether a number of queue elements in the equivalence class time-window queue reaches a set threshold in a set time-window, and report a Down event for each BFD session in the equivalence class set corresponding to the equivalence class set identifier when the number reaches the set threshold.

In an example, the controlling unit 803 is further configured to delete an equivalence class set element corresponding to the BFD session identifier from the equivalence class set corresponding to the equivalence class set identifier.

In an example, the controlling unit 803 adds the queue element corresponding to the BFD session identifier to the equivalence class time-window queue corresponding to the equivalence class set identifier, which specifically includes:

determining whether the equivalence class time-window queue is empty;

when the equivalence class time-window queue is empty, adding the queue element corresponding to the BFD session identifier to the equivalence class time-window queue as a first queue element of the equivalence class time-window queue, where a timestamp of the added queue element is current system time; and when the equivalence class time-window queue is not empty, adding the queue element corresponding to the BFD session identifier behind a last queue element in the equivalence class time-window queue, where a timestamp of the added queue element is current system time.

In an example, the controlling unit 803 is configured to add the queue element corresponding to the BFD session identifier behind the last queue element in the equivalence class time-window queue, which specifically includes:

calculating a difference between the current system time and the timestamp of the first queue element in the equivalence class time-window queue, deleting the first queue element in the equivalence class time-window queue when the calculated difference is greater than a set size for a time-window, and adding the queue element corresponding to the BFD session identifier behind the last queue element in the equivalence class time-window queue.

In an example, the controlling unit 803 reports the Down event for each BFD session in the equivalence class set, which further includes:

clearing equivalence class set elements in the equivalence class set; and clearing queue elements in the equivalence class time-window queue.

In an example, the controlling unit 803 is further configured to:

when the event type identifier indicates an UP event, add an equivalence class set element corresponding to the BFD session identifier to the equivalence class set corresponding to the equivalence class set identifier if a session status in the basic information entry matching the BFD session identifier is Down; and when the event type identifier indicates an Admin Down event, delete the equivalence class set element corresponding to the BFD session identifier from the equivalence class set corresponding to the equivalence class set identifier if the session status in the basic information entry matching the BFD session identifier is UP, and report the BFD session event. Thus, the description of the structure of the device shown in FIG. 8 is completed.

The execution processes of different units in the device may be referred to examples of the method, which will not be redundantly described herein.

Figure 9:
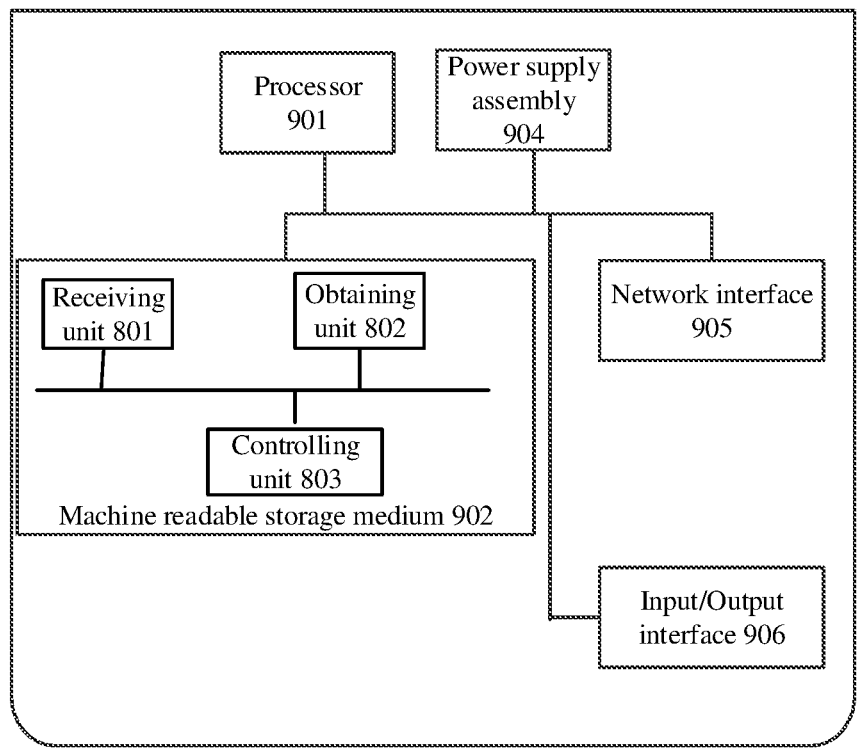
FIG. 9 schematically illustrates a hardware structure diagram of the device shown in FIG. 8 based on an example of the present disclosure.

Correspondingly, the present disclosure also provides an example of the device shown in FIG. 8. FIG. 9 schematically illustrates a hardware structure diagram of the device shown in FIG. 8 based on an example of the present disclosure. The device includes: a processor 901, and a machine readable storage medium 902 that stores machine executable instructions. The processor 901 and the machine readable storage medium 902 may communicate with each other via a system bus 903. Also, the processor 901 may execute the method as described above by reading and executing the machine executable instructions in the machine readable storage medium 902. As shown in FIG. 9, the hardware structure may also include a power supply assembly 904 configured to perform power management on a switching device, a wired or wireless network interface 905 configured to connect the device to a network, and an Input/Output (I/O) interface 906.

The machine readable storage medium 902 described herein may be any electronic, magnetic, optical or other physical storage device, and may contain or store information, such as executable instructions, data and the like. For example, the machine readable storage medium may be a Random Access Memory (RAM), a volatile memory, a nonvolatile memory, a flash memory, a storage drive (e.g., hard disk drive), a solid state hard disk, any type of storage disk (e.g., optical disk, Digital Video Disk (DVD)), or a similar storage medium, or a combination thereof.

The machine readable storage medium 902 is configured to store program instructions run by the receiving unit 801, program instructions run by the obtaining unit 802 and program instructions run by the controlling unit 803. The processor 901 is configured to execute the program instructions run by the receiving unit 801, execute the program instructions run by the obtaining unit 802 and execute the program instructions run by the controlling unit 803, where the processor 901 executes the above program instructions run by different units to implement the method as described above.

Thus, the description of the hardware structure shown in FIG. 9 is completed.

Based on an example of the present disclosure, there is provided a processing device, including:
a processor; and
a non-transitory machine readable storage medium storing machine executable instructions, where by executing the machine executable instructions in the machine readable storage medium, the processor is caused to:
receive a Bidirectional Forwarding Detection (BFD) session event, where the BFD session event carries a BFD session identifier and an event type identifier;
obtain an equivalence class set identifier from a basic information entry matching the BFD session identifier, where the equivalence class set identifier indicates an equivalence class set to which a BFD session corresponding to the BFD session identifier belongs, and BFD sessions carried by a same public network path belong to a same equivalence class set; and
when the event type identifier represents a Down event,
add a queue element corresponding to the BFD session identifier to an equivalence class time-window queue corresponding to the equivalence class set identifier,
determine whether a number of queue elements in the equivalence class time-window queue reaches a set threshold in a set time-window, and
report a Down event for each BFD session in the equivalence class set corresponding to the equivalence class set identifier when the number reaches the set threshold.

When the number of the queue elements in the equivalence class time-window queue reaches the set threshold in the set time-window, the processor is further caused to:
delete an equivalence class set element corresponding to the BFD session identifier from the equivalence class set corresponding to the equivalence class set identifier.

When adding the queue element corresponding to the BFD session identifier to the equivalence class time-window queue corresponding to the equivalence class set identifier, the processor is further caused to:
determine whether the equivalence class time-window queue is empty;
when the equivalence class time-window queue is empty,
add the queue element corresponding to the BFD session identifier to the equivalence class time-window queue as a first queue element of the equivalence class time-window queue, where a timestamp of the added queue element is current system time; and
when the equivalence class time-window queue is not empty,
add the queue element corresponding to the BFD session identifier behind a last queue element in the equivalence class time-window queue, where a timestamp of the added queue element is current system time.

When adding the queue element corresponding to the BFD session identifier behind the last queue element in the equivalence class time-window queue, the processor is further caused to:
calculate a difference between the current system time and the timestamp of the first queue element in the equivalence class time-window queue,
delete the first queue element in the equivalence class time-window queue when the calculated difference is greater than a set size for a time-window, and
add the queue element corresponding to the BFD session identifier behind the last queue element in the equivalence class time-window queue.

After reporting a Down event for each BFD session in the equivalence class set corresponding to the equivalence class set identifier, the processor is further caused to:
clear equivalence class set elements in the equivalence class set; and
clear queue elements in the equivalence class time-window queue.

The processor is further caused to:
when the event type identifier indicates an UP event,
add an equivalence class set element corresponding to the BFD session identifier to the equivalence class set corresponding to the equivalence class identifier if a session status in the basic information entry matching the BFD session identifier is Down; and
when the event type identifier indicates an Admin Down event,
delete the equivalence class set element corresponding to the BFD session identifier from the equivalence class set corresponding to the equivalence class set identifier if the session status in the basic information entry matching the BFD session identifier is UP, and report the BFD session event.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be choosed based on actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device based on the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of preventing a failure processing delay, comprising:

receiving, by a processor, a Bidirectional Forwarding Detection (BFD) session event, wherein the BFD session event carries a BFD session identifier and an event type identifier, and wherein the BFD session event includes an event which is triggered by a BFD session for a Pseudo-Wire (PW) associated with the BFD session;

searching for, by the processor, a basic information entry using the BFD session identifier as a keyword;

obtaining, by the processor, an equivalence class set identifier from the basic information entry matching the BFD session identifier, wherein the equivalence class set identifier indicates an equivalence class set to which the BFD session corresponding to the BFD session identifier belongs, and BFD sessions carried by a same public network path belong to a same equivalence class set; and adding, by the processor, a queue element corresponding to the BFD session identifier of which the BFD session has an event type identifier indicating a Down event and belongs to the same equivalence class set, to an equivalence class time-window queue corresponding to the equivalence class set identifier, determining, by the processor, whether a number of queue elements in the equivalence class time-window queue reaches a set threshold in a set time-window, and reporting a Down event for each BFD session in the equivalence class set corresponding to the equivalence class set identifier when the number reaches the set threshold.

2. The method according to claim 1, when the number of the queue elements in the equivalence class time-window queue reaches the set threshold in the set time-window, the method further comprising:

deleting, by the processor, an equivalence class set element corresponding to the BFD session identifier from the equivalence class set corresponding to the equivalence class set identifier.

3. The method according to claim 1, wherein adding the queue element corresponding to the BFD session identifier to the equivalence class time-window queue corresponding to the equivalence class set identifier comprises:

determining, by the processor, whether the equivalence class time-window queue is empty;

when the equivalence class time-window queue is empty, adding, by the processor, the queue element corresponding to the BFD session identifier to the equivalence class time-window queue as a first queue element of the equivalence class time-window queue, wherein a timestamp of the added queue element is current system time; and when the equivalence class time-window queue is not empty, adding, by the processor, the queue element corresponding to the BFD session identifier behind a last queue element in the equivalence class time-window queue, wherein a timestamp of the added queue element is current system time.

4. The method according to claim 3, wherein adding the queue element corresponding to the BFD session identifier behind the last queue element in the equivalence class time-window queue comprises:

calculating, by the processor, a difference between the current system time and the timestamp of the first queue element in the equivalence class time-window queue, deleting, by the processor, the first queue element in the equivalence class time-window queue when the calculated difference is greater than a set size for a time-window, and adding, by the processor, the queue element corresponding to the BFD session identifier behind the last queue element in the equivalence class time-window queue.

5. The method according to claim 1, the method further comprising:

after reporting the Down event for each BFD session in the equivalence class set corresponding to the equivalence class set identifier, clearing, by the processor, equivalence class set elements in the equivalence class set; and clearing, by the processor, queue elements in the equivalence class time-window queue.

6. The method according to claim 1, further comprising:

when the event type identifier indicates an UP event, adding, by the processor, an equivalence class set element corresponding to the BFD session identifier to the equivalence class set corresponding to the equivalence class set identifier if a session status in the basic information entry matching the BFD session identifier is Down; and when the event type identifier indicates an Admin Down event, deleting, by the processor, the equivalence class set element corresponding to the BFD session identifier from the equivalence class set corresponding to the equivalence class set identifier if the session status in the basic information entry matching the BFD session identifier is UP, and reporting, by the processor, the BFD session event.

7. A processing device, comprising:

a processor; and a non-transitory machine readable storage medium storing machine executable instructions, wherein by executing the machine executable instructions in the machine readable storage medium, the processor is caused to:

receive a Bidirectional Forwarding Detection (BFD) session event, wherein the BFD session event carries a BFD session identifier and an event type identifier, and the BFD session event includes an event which is triggered by a BFD session for a Pseudo-Wire (PW) associated with the BFD session;

search for a basic information entry using the BFD session identifier as a keyword;

obtain an equivalence class set identifier from the basic information entry matching the BFD session identifier, wherein the equivalence class set identifier indicates an equivalence class set to which the BFD session corresponding to the BFD session identifier belongs, and BFD sessions carried by a same public network path belong to a same equivalence class set; and add a queue element corresponding to the BFD session identifier of which the BFD session has an event type identifier indicating a Down event and belongs to the same equivalence class set, to an equivalence class time-window queue corresponding to the equivalence class set identifier, determine whether a number of queue elements in the equivalence class time-window queue reaches a set threshold in a set time-window, and report a Down event for each BFD session in the equivalence class set corresponding to the equivalence class set identifier when the number reaches the set threshold.

8. The device according to claim 7, wherein when the number of the queue elements in the equivalence class time-window queue reaches the set threshold in the set time-window, the processor is further caused to:

delete an equivalence class set element corresponding to the BFD session identifier from the equivalence class set corresponding to the equivalence class set identifier.

9. The device according to claim 7, wherein when adding the queue element corresponding to the BFD session identifier to the equivalence class time-window queue corresponding to the equivalence class set identifier, the processor is further caused to:
- determine whether the equivalence class time-window queue is empty;
- when the equivalence class time-window queue is empty, add the queue element corresponding to the BFD session identifier to the equivalence class time-window queue as a first queue element of the equivalence class time-window queue, wherein a timestamp of the added queue element is current system time; and when the equivalence class time-window queue is not empty, add the queue element corresponding to the BFD session identifier behind a last queue element in the equivalence class time-window queue, wherein a timestamp of the added queue element is current system time.

10. The device according to claim 9, wherein when adding the queue element corresponding to the BFD session identifier behind the last queue element in the equivalence class time-window queue, the processor is further caused to:
- calculate a difference between the current system time and the timestamp of the first queue element in the equivalence class time-window queue, delete the first queue element in the equivalence class time-window queue when the calculated difference is greater than a set size for a time-window, and add the queue element corresponding to the BFD session identifier behind the last queue element in the equivalence class time-window queue.

11. The device according to claim 7, wherein, the processor is further caused to:
- after reporting the Down event for each BFD session in the equivalence class set corresponding to the equivalence class set identifier, clear equivalence class set elements in the equivalence class set; and clear queue elements in the equivalence class time-window queue.

12. The device according to claim 7, wherein the processor is further caused to:
- when the event type identifier indicates an UP event, add an equivalence class set element corresponding to the BFD session identifier to the equivalence class set corresponding to the equivalence class set identifier if a session status in the basic information entry matching the BFD session identifier is Down; and when the event type identifier indicates an Admin Down event, delete the equivalence class set element corresponding to the BFD session identifier from the equivalence class set corresponding to the equivalence class set identifier if the session status in the basic information entry matching the BFD session identifier is UP, and report the BFD session event.

* * * * *